United States Patent
Fujimoto et al.

[11] Patent Number: 5,911,609
[45] Date of Patent: Jun. 15, 1999

[54] WATERCRAFT EXHAUST SYSTEM

[75] Inventors: Hiroaki Fujimoto; Takehisa Suzuki; Shigeyuki Ozawa, all of Shizuoka, Japan

[73] Assignee: Sanshin Kogyo Kabushiki Kaisha, Japan

[21] Appl. No.: 08/842,623

[22] Filed: Apr. 15, 1997

[30]  Foreign Application Priority Data

Apr. 15, 1996  [JP]  Japan .................................. 8-092587

[51] Int. Cl.⁶ .................................................. B63H 21/32
[52] U.S. Cl. .............................................. 440/89; 60/276
[58] Field of Search ..................... 440/88, 89, 1; 60/276, 302

[56]  References Cited

U.S. PATENT DOCUMENTS

| | | | |
|---|---|---|---|
| 5,271,477 | 12/1993 | Gekka et al. .............................. | 60/302 |
| 5,271,480 | 12/1993 | Takegami .................................. | 60/276 |
| 5,360,081 | 11/1994 | Takegami .................................. | 60/276 |
| 5,408,872 | 4/1995 | Nonaka ..................................... | 73/118 |
| 5,425,232 | 6/1995 | Holtermann .............................. | 440/89 |
| 5,579,745 | 12/1996 | Katoh et al. ............................. | 123/679 |
| 5,584,281 | 12/1996 | Katoh ....................................... | 123/481 |
| 5,637,792 | 6/1997 | Kimura et al. ............................ | 73/116 |
| 5,694,909 | 12/1997 | Kato ......................................... | 123/672 |
| 5,697,353 | 12/1997 | Katoh et al. ............................. | 123/679 |
| 5,702,276 | 12/1997 | Nakase et al. ............................ | 440/89 |
| 5,711,148 | 1/1998 | Katoh ........................................ | 60/276 |
| 5,712,422 | 1/1998 | Kato .......................................... | 73/23.31 |

*Primary Examiner*—Jesus D. Sotelo
*Attorney, Agent, or Firm*—Knobbe, Martens, Olson & Bear, LLP

[57]  ABSTRACT

An arrangement of an exhaust gas collection port within an exhaust system of a small watercraft increases the accuracy of an associated probe's readings. The port is located upstream of a point where cooling water is introduced into the exhaust system for silencing purposes. As a result, the ingress and egress of exhaust gases flow into and out of the port is generally unimpeded by the cooling water. The tendency of water to enter and clog the port is also reduced. The precision of the associated exhaust probe measurements consequently is greatly increased.

16 Claims, 6 Drawing Sheets

WATERCRAFT EXHAUST SYSTEM

BACKGROUND OF THE INVENTION

1. Field of the Invention

The present invention relates to an exhaust system for a watercraft, and more particularly to a catalytic exhaust system.

2. Description of Related Art

Personal watercraft have become very popular in recent years. This type of watercraft is quite sporting in nature and carries one or more riders. A relatively small hull of the personal watercraft commonly defines a riders' area above an engine compartment. A two-cycle internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft usually extends between the engine and the jet propulsion device, through a bulkhead of the hull tunnel.

An exhaust system of the personal watercraft discharges engine exhaust to the atmosphere either through or close to the body of water in which the watercraft is operating. Although submerged discharge of engine exhaust silences exhaust noise, environmental concerns arise. These concerns are particularly acute in connection with two-cycle engines because engine exhaust from two-cycle engines often contains lubricants and other hydrocarbons.

Such environmental concerns have raised a desire to minimize exhaustion of hydrocarbons and other exhaust byproducts (e.g., carbon monoxide and oxides of nitrogen), and thus reduce pollution of the atmosphere and the body of water in which the watercraft is operated. In response to the increased concerns regarding exhaust emissions, some personal watercraft engines recently have become equipped with a catalyst to convert exhaust byproducts to harmless gases.

Catalysts must operate at a relatively high temperature in order to produce the necessary thermal reaction and burning of the exhaust byproducts. A catalytic device thus desirably operates within a specific range of temperature so as to effectively and efficiently convert engine exhaust into generally harmless gases.

Some prior exhaust systems have employed a cooling jacket about the catalytic device to maintain the catalytic device within the desired temperature range. In some systems, at least a portion of the cooling water also is introduced into the exhaust system not only to further cool and silence the exhaust gases, but also to assist the discharge of exhaust gases. The added water to the exhaust system, however, gives rise to possible damage to the catalyst.

In addition, some personal watercraft engines recently have become equipped with electronic control units that adjust the fuel/air charge delivered to the engine depending upon the operating condition of the engine. The ECU receives signal data from a variety of engine sensors and then controls engine operation in order to optimize performance, while minimizing hydrocarbon emissions.

An oxygen sensor is one of the main controlling sensors in the control system. The oxygen sensor monitors oxygen content in the exhaust. The amount of oxygen in the exhaust indicates the richness (low oxygen content) or leanness (high oxygen content) of the fuel/air charge. Based upon this information, the ECU alters the concentration of fuel in the air fuel charge to control emissions. The oxygen sensor probe often is located in a probe aperture in which exhaust gases collect for sampling. The pressure pulses or waves within the exhaust system produce a flow of exhaust gas into and out of the aperture for sampling purposes.

The cooling water introduced into the exhaust system, however, often interferes with the collection of exhaust gases in the exhaust probe aperture. The cooling water also commonly invades the aperture, thereby preventing an influx of exhaust gases. The oxygen sensor consequently provides imprecise measurements of the oxygen content in the exhaust gas flow.

SUMMARY OF THE INVENTION

A need therefore exists for an arrangement of an exhaust gas collection port within an exhaust system that allows for both the exhaust gas silencing achieved by mixing coolant with the exhaust gas flow and the sample collection of exhaust gas without substantial interference by the coolant within the exhaust system.

An aspect of the present invention thus involves an exhaust system for a watercraft. The watercraft comprises an internal combustion engine having at least one exhaust port and an output shaft that drives a propulsion device. The exhaust system includes an exhaust passage that extends between the engine exhaust port and a discharge port. A catalytic device of the exhaust system treats exhaust gases from the engine before discharge through the discharge port. A coolant inlet port opens into the exhaust passage downstream of the catalytic device, and a gas collection port opens into the exhaust passage at a point between the catalyst device and the coolant inlet port. The coolant introduced into the exhaust steam does not meaningfully interfere with the collection of the exhaust gas through the exhaust collection port with this arrangement of the respective ports.

Further aspects, features, and advantages of the present invention will become apparent from the detailed description of the preferred embodiments which follows.

BRIEF DESCRIPTION OF THE DRAWINGS

The above-mentioned and other features of the invention will now be described with reference to the drawings of preferred embodiments of the present watercraft exhaust system. The illustrated embodiments of the watercraft exhaust system are intended to illustrate, but not to limit the invention. The drawings contain the following figures.

DETAILED DESCRIPTION OF PREFERRED EMBODIMENTS

Several embodiments of the catalytic exhaust system are disclosed herein. Each of these embodiments employ the same basic concepts characteristic of the improved features of the exhaust system, namely an arrangement of an exhaust gas collection port within an exhaust system that allows for collection of exhaust gases without substantial interference from cooling water within the exhaust system.

Figure 1:
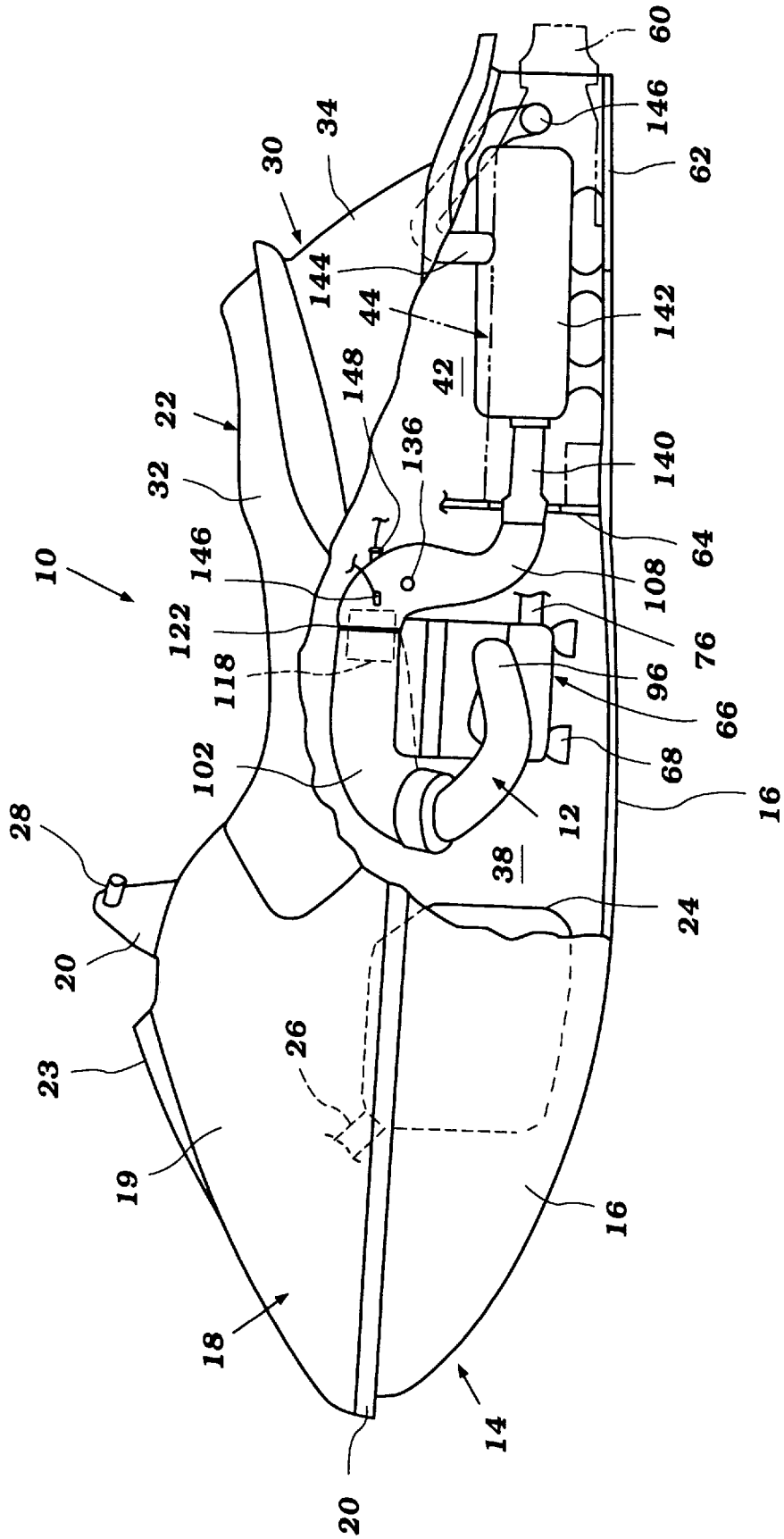
FIG. 1 is a partial sectional, side elevational view of a personal watercraft including an exhaust system configured in accordance with a preferred embodiment of the present invention.
Figure 2:
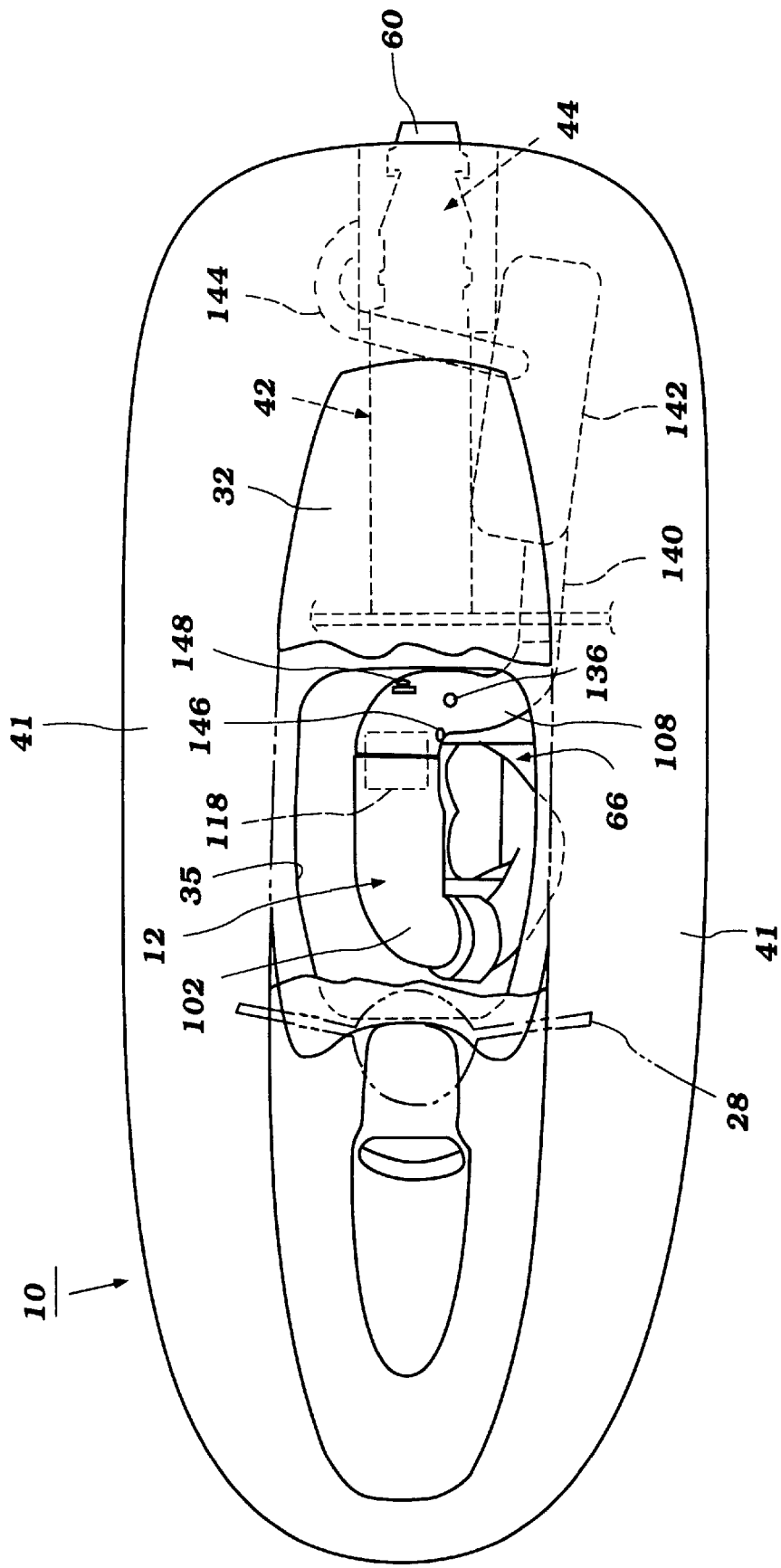
FIG. 2 is a partial sectional, top plan view of the personal watercraft of FIG. 1.

FIGS. 1 and 2 illustrate a personal watercraft 10 which includes an exhaust system 12 configured in accordance with a preferred embodiment of the present invention. Although the present exhaust system 12 is illustrated in connection with a personal watercraft, the catalytic exhaust system can be used with other types of watercraft as well, such as, for example, but without limitation, small jet boats and the like. Before describing the exhaust system 12, an exemplary personal watercraft 10 will first be described in general details to assist the reader's understanding of the environment of use and the operation of the exhaust system 12.

The watercraft 10 includes a hull 14 formed by a lower hull section 16 and an upper deck section 18. The hull sections 16, 18 are formed from a suitable material such as, for example, a molded fiberglass reinforced resin. The lower hull section 16 and the upper deck section 18 are fixed to each other around the peripheral edges 20 in any suitable manner.

As viewed in the direction from the bow to the stern of the watercraft, the upper deck section 18 includes a bow portion 19, a control mast 20 and a rider's area 22. The bow portion 19 slopes upwardly toward the control mast 20 and includes at least one air duct through which air can enter the hull. A cover 23 desirably extends above an upper end of the air duct to inhibit an influx of water into the hull.

A fuel tank 24 is located within the hull 14 beneath the cover 23. Conventional means, such as, for example, straps, secure the fuel tank 24 to the lower hull 16. A fuel filler hose 26 extends between a fuel cap assembly and the fuel tank 24. In the illustrated embodiment, the filler cap assembly (not shown) is secured to the bow portion 19 of the hull upper deck 18 to the side and in front of the control mast 20. In this manner, the fuel tank can be filled from outside the hull 14 with the fuel passing through the fuel filler hose 26 into the tank 24.

The control mast 20 extends upward from the bow portion 19 and supports a handlebar assembly 28. The handlebar 28 controls the steering of the watercraft 10 in a conventional manner. The handlebar assembly 28 also carries a variety of controls of the watercraft 10, such as, for example, a throttle control, a start switch and a lanyard switch.

The rider's area 22 lies behind the control mast 20 and includes a seat assembly 30. In the illustrated embodiment, the seat assembly 30 has a longitudinally extending straddle-type shape that may be straddled by an operator and by at least one or two passengers. The seat assembly 30, at least in principal part, is formed by a seat cushion 32 supported by a raised pedestal 34. The raised pedestal 34 has an elongated shape and extends longitudinally along the center of the watercraft 10. The seat cushion 32 desirably is removably attached to a top surface of the pedestal 34 and covers the entire upper end of the pedestal for rider and passenger comfort.

An access opening 35 is located on an upper surface of the pedestal 34. The access opening 35 opens into an engine compartment 38 formed within the hull 14. The seat cushion 32 normally covers and seals closed the access opening 35. When the seat cushion 32 is removed, the engine compartment 38 is accessible through the access opening 35.

The pedestal 34 also desirably includes at least one air duct located behind the access opening. The air duct communicates with the atmosphere through a space between the pedestal 34 and the cushion 32 which is formed behind the access opening. Air passes through the rear duct in both directions.

The upper deck section 18 of the hull 12 advantageously includes a pair of raised gunnels 39 (FIG. 3) positioned on opposite sides of the aft end of the upper deck assembly 18. The raised gunnels 39 define a pair of foot areas 41 that extend generally longitudinally and parallel to the sides of the pedestal 34. In this position, the operator and any passengers sitting on the seat assembly 30 can place their feet in the foot areas 41 with the raised gunnels shielding the feet and lower legs of the riders. A non-slip (e.g., rubber) mat desirably covers the foot areas 41 to provide increased grip and traction for the operator and the passengers.

The lower hull portion 16 principally defines the engine compartment 38. Except for the air ducts, the engine compartment 38 is normally substantially sealed so as to enclose an engine of the watercraft 10 from the body of water in which the watercraft is operated.

The lower hull 16 is designed such that the watercraft 10 planes or rides on a minimum surface area at the aft end of the lower hull 16 in order to optimize the speed and handling of the watercraft 10 when up on plane. For this purpose, the lower hull section generally has a V-shaped configuration formed by a pair of inclined section that extend outwardly from a keel line of the hull to the hull's side walls at a dead rise angle. The inclined sections also extend longitudinally from the bow toward the transom of the lower hull 14. The side walls are generally flat and straight near the stern of the lower hull and smoothly blend towards the longitudinal center of the watercraft at the bow. The lines of intersection between the inclined section and the corresponding side wall form the outer chines of the lower hull section.

Toward the transom of the watercraft, the incline sections of the lower hull 16 extend outwardly from a recessed channel or tunnel 42 that extends upward toward the upper deck portion 16. The tunnel 42 has a generally parallelepiped shape and opens through the rear of the transom 43 of the watercraft 10, as seen in FIG. 1.

In the illustrated embodiment, a jet pump unit 44 propels the watercraft 10. The jet pump unit 44 is mounted within the tunnel 42 formed on the underside of the lower hull section 16 by a plurality of bolt. An intake duct of the jet pump unit 44 defines an inlet opening that opens into a gullet. The gullet leads to an impeller housing assembly in which the impeller of the jet pump 44 operates. An impeller housing assembly also acts as a pressurization chamber and delivers the water flow from the impeller housing to a discharge nozzle housing.

A steering nozzle 60 is supported at the downstream end of the discharge nozzle by a pair of vertically extending pivot pins. In an exemplary embodiment, the steering nozzle 60 has an integral lever on one side that is coupled to the handlebar assembly 28 through, for example, a bowden-wire actuator, as known in the art. In this manner, the operator of the watercraft can move the steering nozzle 60 to effect directional changes of the watercraft 10.

A ride plate 62 covers a portion of the tunnel 42 behind the inlet opening to enclose the pump assembly and the nozzle assembly 60 of the propulsion unit 44 within the tunnel 42. In this manner, the lower opening of the tunnel 42 is closed to provide a planing surface for the watercraft 10.

An impeller shaft supports the impeller within the impeller housing of the unit 44. The aft end of the impeller shaft is suitable supported and journalled within the compression chamber of the assembly in a known manner. The impeller shaft extends in the forward direction through a front wall or bulkhead 64 of the tunnel 42.

An internal combustion engine 66 of the watercraft powers the impeller shaft to drive the impeller of the jet pump unit 44. The engine 66 is positioned within the engine compartment 38 and is mounted primarily beneath the control mast 20. Vibration-absorbing engine mounts 68 secure the engine 66 to the lower hull portion 16 in a known manner. The engine 66 is mounted in approximately a central position in the watercraft 10.

In the illustrated embodiment, the engine 66 includes two in-line cylinders and operates on a two-stroke, crankcase compression principle. The engine 66 is positioned such that the row of cylinders lies parallel to a longitudinal axis of the watercraft 10, running from bow to stern. The axis of each cylinder is skewed or inclined relative to a vertical central plane of the watercraft 10, in which the longitudinal axis lies. This engine type, however, is merely exemplary. Those skilled in the art will readily appreciate that the present fuel delivery system can be used with any of a variety of engine types having other number of cylinders, having other cylinder arrangements and operating on other combustion principles (e.g., four-stroke principle).

Figure 3:
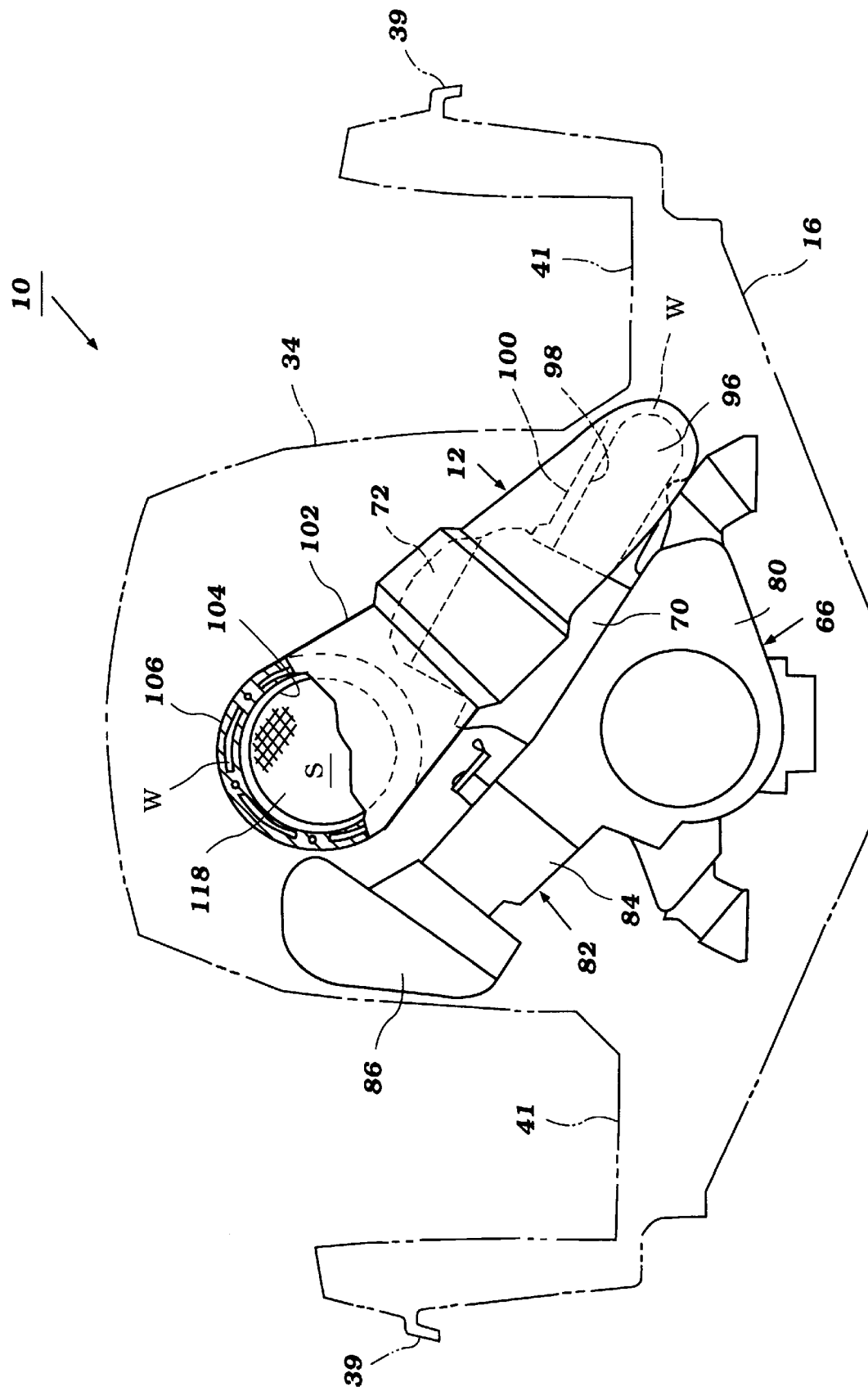
FIG. 3 is a partial sectional, front elevational view of an engine of the watercraft of FIG. 1 and illustrates a cross-section of a surrounding hull in phantom lines.

As best seen in FIG. 3, a cylinder block 70 and a cylinder head assembly 72 desirably form the cylinders of the engine 66. A piston reciprocates within each cylinder of the engine 66 and together the pistons drive an output shaft 76 (FIG. 1), such as a crankshaft, in a known manner. A connecting rod links the corresponding piston to the crankshaft 76. The corresponding cylinder bore, piston and cylinder head of each cylinder forms a variable-volume chamber, which at a minimum volume defines a combustion chamber.

The crankshaft 76 desirably is journalled with a crankcase, which in the illustrated embodiment is formed between a crankcase member 80 and a lower end of the cylinder block 70. Individual crankcase chambers of the engine are formed within the crankcase by dividing walls and sealing disks, and are sealed from one another with each crankcase chamber communicating with a dedicated variable-volume chamber.

Each crankcase chamber also communicates with an intake passage of an induction system 82 through a check valve (e.g., a reed-type valve). In the illustrated embodiment, the intake passage is integrally formed with the crankcase member 80; however, the engine 66 can also use a separate intake manifold equally well. A charge former 84 (e.g., a carburetor) of the induction system 82 communicates with an inlet end of the intake passage. The charge former 82 system receives fuel from the fuel tank 24 and produces the fuel charge which is delivered to the cylinders in a known manner. In the illustrated embodiment, an air intake silencer 86 is connected to an air inlet end of a throttle passage of each charge former 84. The flow path from the air intake silencer 86, through the charge former 84 and intake passage and into the corresponding crankcase chamber desirably is along a flow axis which generally is inclined relative to the central vertical plane and lies on a side of the plane opposite of the corresponding cylinder. Because the internal details of the engine 66 and the induction system 82 desirably are conventional, a further description of the engine construction is not believed necessary to understand and practice the invention.

The propulsion unit 44 supplies cooling water through a conduit to an engine cooling jacket. For this purpose, an outlet port is formed on the housing the pressurization chamber assembly of the jet pump 44. The conduit is coupled to the outlet port and extends to an inlet port to the engine water jacket. In the illustrated embodiment, the inlet port desirably lies at the lower rear end of the engine 66, either on the cylinder block 70 or on an exhaust manifold 96 of the engine which is attached to the cylinder block 70.

The engine cooling jacket extends through the exhaust manifold 96, through the cylinder block 70, about the cylinders, and through the cylinder head assembly 72. Either the cylinder head assembly 72 or the exhaust manifold 96 can include a coolant discharge port through which the cooling water exits the engine 38 and thence flows through at least a portion of the exhaust system 12. In the illustrated embodiment, the discharge port is formed in the cylinder head assembly 72. A conduit 98 connects the discharge port to the exhaust system 12.

The personal watercraft 10 so far described represents only an exemplary watercraft on which the present exhaust system 12 can be employed. A further description of the personal watercraft 10 is not believed necessary for an understanding and an appreciation of the present exhaust system 12. The exhaust systems will now be described in detail.

The exhaust system 12 discharges exhaust byproducts from the engine 66 to the atmosphere and/or to the body of water in which the watercraft 10 is operated. As best seen in FIGS. 1 and 2, the exhaust system 12 includes the exhaust manifold 96 that is affixed to the side of the cylinder block 70 and which receives exhaust gases from the combustion chambers through exhaust ports in a well-known manner. For this purpose, the exhaust manifold desirably includes a number of runners equal in number to the number of cylinders. Each runner communicates with the exhaust port (s) of the respective cylinder. The runners of the exhaust manifold 96 thence merge together to form a common exhaust path that terminates at an outlet end of the manifold 96.

As best understood from FIG. 3, the exhaust manifold 96 has a dual shell construction formed by an inner wall 98 and an outer wall 100. A water jacket W is formed between the two walls 98, 100 and communicates with one or more water passages within the engine block 70. Cooling water therefore flow from the engine block 70 into the water jacket W of the exhaust manifold 96. This dual wall construction desirably is formed along each runner of the manifold 96, as well as about the common flow section of the manifold 96.

An outlet end of the exhaust manifold 96 communicates with an exhaust expansion chamber 102. As best seen in FIG. 1, the outlet end of the manifold 96 turns upward to mate with a down-turned inlet end of the expansion chamber 102.

With reference to FIG. 3, the expansion chamber 102 has generally tubular shape with an enlarged cross-sectional flow area as compared to the exhaust manifold 96 to allow the exhausts gases to expand and silence, as known in the art. A thick-wall, which is defined between an inner surface 104 and an outer surface 106 forms the tubular shape of the exhaust chamber 102. The inner surface 104 defines the exhaust flow passage S through the exhaust chamber 102. A plurality of water passages W extend along side the flow passage S through the thick wall of the exhaust chamber 102. The water passages W desirably are spaced about the inner surface 104.

Figure 4:
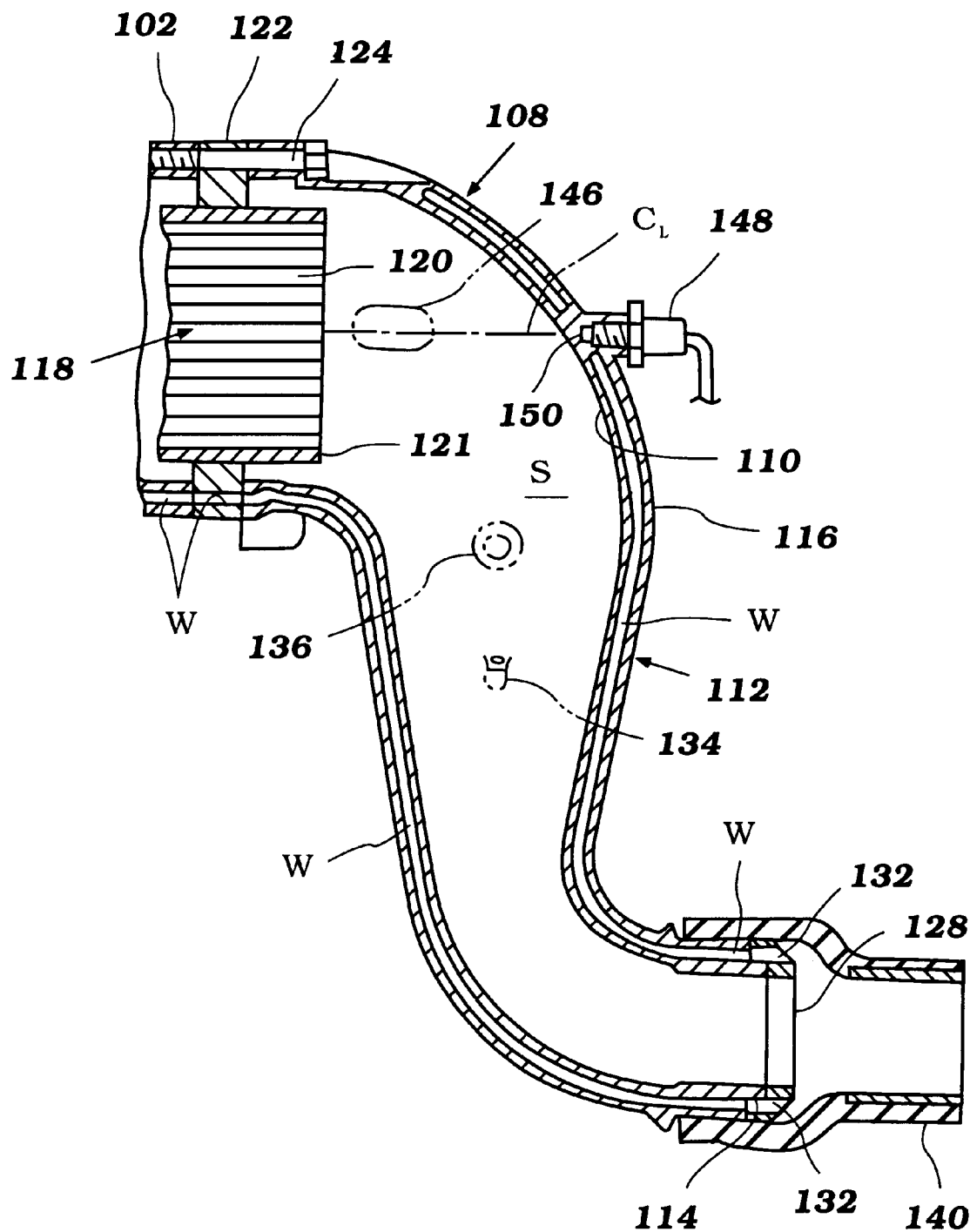
FIG. 4 is a side cross-sectional view of an upper exhaust pipe of the exhaust system of FIG. 1.
Figure 5:
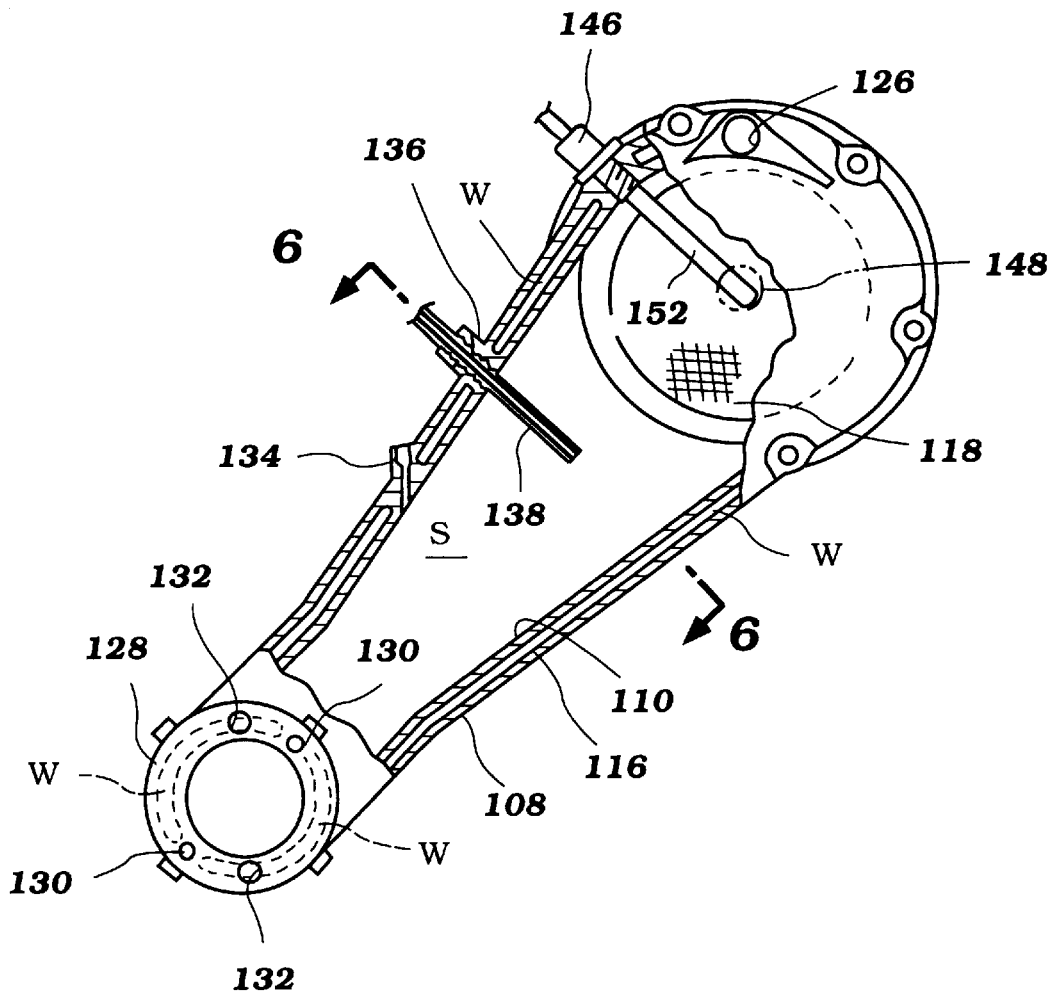
FIG. 5 is a rear partial sectional view of the upper exhaust pipe of the FIG. 4.
Figure 6:
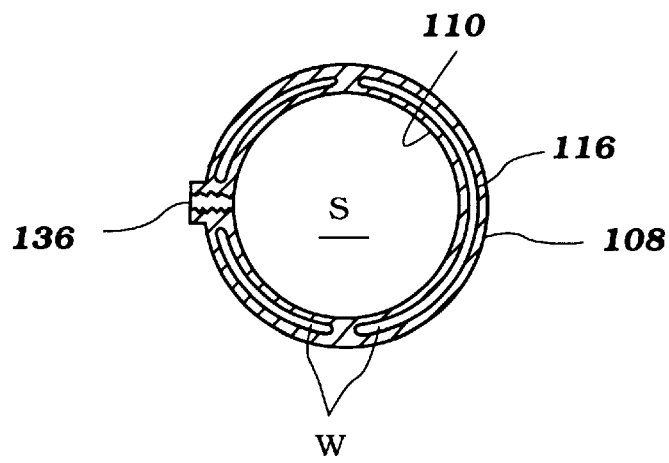
FIG. 6 is a cross-sectional view of the exhaust pipe of FIG. 5 taken along lines 6—6 and illustrates an exhaust collection port with an exhaust passage element removed.

An outlet end of the exhaust chamber 102 communicates with an inlet end of a lower exhaust chamber 108. As seen in FIGS. 4 through 6, the exhaust chamber 108 has a dual shell construction formed by an inner shell 110 which defines an exhaust flow passage S. The inner shell 110 has a diameter at its inlet end that generally matches the diameter of the downstream end of the expansion chamber 102. As best seen in FIG. 4, the inner tube 110 turns down into a vertical section 112 (goose neck-like section) and thence transitions to a lower discharge end 114 arranged to give the inner shell a generally reverse S-like shape. The inner shell 110 also extends to one side of the engine 66, as best seen in FIGS. 2 and 5.

An outer shell 116 is connected to the inner shell 110 and generally has a corresponding shape to that of the inner shell 110. The inner and outer shells 110, 116 thus together define a cooling jacket W about the inner shell 110. The water jacket W of the exhaust chamber 108 communicates with the water jacket W of the expansion chamber 102 to receive cooling water from the engine 66.

The exhaust system 12 also includes a catalytic device 118. The catalytic device 118 desirably includes a catalyst bed 120 to convert at least a portion of the exhaust gases into harmless gases (e.g., carbon dioxide and water). The catalyst bed 120 lies within the exhaust gas flow through the exhaust system 12 at a position that mandates that all exhaust gases must pass through the catalyst bed 120. The catalyst 120 reduces the emissions of hydrocarbons and other exhaust byproducts (e.g., carbon monoxide and oxides of nitrogen) from the watercraft engine.

For this purpose, the catalyst bed 120 is formed of a catalytic material, which is designed to render harmless either all or some of the exhaust byproducts. For example, the catalyst bed 120 can be made of a metal catalyst material, such as, for example, platinum. The catalyst bed 120, however, can be made of different types of catalytic materials for treating different exhaust byproducts or lubricant.

The catalyst bed 120, in the illustrated embodiment, takes the form of a honeycomb-type catalyst bed. A tubular shell 121 desirably supports the catalyst bed 120 with an annular flange 122 supporting the shell 121. The flange 122 is held between the corresponding ends of the expansion chamber 102 and the exhaust chamber 108. Bolts 124 secure together the ends of the chambers 102, 108 with the flange 122 interposed therebetween. In this position, the catalytic device 118 lies below the access opening 35 for maintenance and servicing ease.

The annular flange 122 also includes a plurality of apertures W which place the cooling passages W of the expansion chamber 102 in communication with the water jacket W of the exhaust chamber 108.

A majority of the cooling water that flows through the apertures W in the flange subsequently flows through the water jacket W of the exhaust chamber 108 to the discharge end 114 of the chamber 108. A small portion of the water flow, however, is directed through a port 126 which communicates with a telltale or pilot water port via a connecting conduit. The telltale port provides a visual indication to the rider that the water cooling system is functioning properly.

A throttle ring 128 is attached to the lower end 114 of the exhaust chamber 108 by bolts that pass through several through holes 130 in the throttle ring 128. The throttle ring 128 has an inner diameter that generally matches the diameter of the exhaust passage S at the lower end 114. Several apertures 132 extend through the throttle passage and are arranged to communicate with the water jacket W of the exhaust chamber 108. The apertures 132, however, provide a significantly smaller cross-sectional flow area than the water jacket W to restrict water flow through the exhaust chamber water jacket W. As best understood from FIG. 4, the apertures 132 open into a common exhaust passage downstream of the exhaust chamber 108. In this manner, the water flow through the water jacket W merges with the exhaust gas flow through the exhaust passage in order to silence and cool the exhaust gases.

A water inlet port 134 extends through the side of the exhaust chamber 108. In the illustrated embodiment, the water inlet port 134 is located in the generally vertical section 112 of the chamber 108. And as best seen in FIG. 5, the water inlet port 134 slopes downward toward the discharge end 114 of the chamber 108 and away from the catalytic device 118. Thus, an axis of the port 134 in a direction into the exhaust passage extends away from the catalytic device 118, as well as away from one or more sensors, which are described below.

A source of cooling water communicates with the inlet port 134 to introduce a cooling water into the exhaust chamber 108 for cooling and silencing purposes within the chamber 108. Fresh (i.e., unheated) cooling water can be directly supplied from the jet pump unit 44 or from a bilge pump located within the lower hull portion 16. Cooling water can also be delivered from other cooling jackets or passages of the engine 66 or of associated equipment. For this purpose, a delivery conduit (not shown) desirably is connected to the port 134 for delivering this additional cooling water into the chamber 108.

As best seen in FIGS. 5 and 6, an exhaust gas collection port 136 is formed in exhaust chamber 108. The port 136 desirably extends through both the inner and outer shells 110, 116 of the chamber 108. The port 136 also is formed such that the water jacket W of the chamber 108 surrounds the port 136, as appreciated from a review of FIGS. 5 and 6.

In the illustrated embodiment, the port 136 is tapped and receives a threaded portion of an L-shaped exhaust gas collection element 138 that projected into the chamber 108. The distal end of the collection element 138 desirably lies at approximately the center of the exhaust passage S in the generally vertical section 112 of the chamber 108. The axis of the port 136 also desirably lies generally transverse to an axis of the generally vertical section 112 such that the distal end of the gas collection element 138 is substantially perpendicular to the gas flow through the corresponding section of the chamber 108.

In this position, the exhaust gas collection port 136 lies generally beneath the access opening 35 in the upper deck 18,, as best seen in FIG. 2. This location facilitates easily maintenance and replacement of the collection element 138, as well as an associated oxygen probe (not shown). In addition, the collection port 136 is adapted to receive other types of exhaust gas sensors for sampling and analyzing the exhaust gas content for diagnostic purposes. If, for example, the engine 66 is running rough, a mechanic may remove either the oxygen sensor or the entire collection element 138 and insert in its place an exhaust gas sensor plug. The sensor obtains a sample of the exhaust gases for analysis for diagnosis. Once analysis is complete, the oxygen sensor and/or the collection element 138 can be reinstalled for use during normal operation, as described below.

With reference to FIGS. 1 and 4, a flexible pipe section 140 is connected to the discharge end 114 of the exhaust chamber 108 and the throttle ring 132 and extends rearwardly along one side of the watercraft hull tunnel 42. The flexible conduit 140 connects to an inlet section of a water trap device 142. The water trap device 142 also lies within the watercraft hull 14 on the same side of the tunnel 42.

The water trap device 142 has a sufficient volume to retain water and to preclude the back flow of water to the expansion chamber 102 and the engine 66. Internal baffles within the water trap device 142 help control water flow through the exhaust system 12.

An exhaust pipe 144 extends from an outlet section of the water trap device 142 and wraps over the top of the tunnel 42 to a discharge end 144. The discharge end 144 desirably opens into the tunnel 42 or through the transom of the watercraft 10 at an area that is close to or actually below the water level with the watercraft 10 floating at rest on the body of water.

A control system desirably manages the operation of the engine 66. The control system includes an electronic control unit (ECU) that receives signals from various sensors regarding a variety of engine functions. As part of a feedback control system, the ECU receives signals from an oxygen sensor that sensors oxygen content of exhaust gases collected in the collection element 138 mounted within the exhaust collection port 136. The oxygen sensor produces a signal indicative of the sensed oxygen content. Based upon this information, the ECU adjusts the fuel/air ratio.

The position of the probe upstream of both the water inlet port 134 as well as the merge point of the cooling water with the exhaust stream at the discharge end 114 of the chamber 108 generally isolates the collection process from the effects of the water flow through the exhaust system 12. While some coolant may travel backward toward the collection element 138 on occasion, such as by force of strong exhaust gas pulses, no meaningful amount of liquid coolant is present within the exhaust stream at the point of sampling, and thus, the gases can flow freely through the collection element 138 without impedance from entrained liquid in the flow. The oxygen sensor therefore more accurately senses the oxygen content of the exhaust stream for improved engine control.

In order to monitor the exhaust system 12, the ECU can also communicate with one or more temperature sensors. In the illustrated embodiment, the ECU communicates with an exhaust gas temperature sensor 146 and an exhaust pipe temperature sensor 148. The transducers of the sensors 146, 148 desirably are positioned to lie generally along a center line CL of the exhaust passage S as it passes through the catalyst bed 118.

As best seen in FIG. 4, the exhaust pipe temperature sensor 148 is removably attached to a mounting aperture formed in the exhaust chamber 108. When assembled, a transducer element 150 of the sensor 148 contact the inner shell 110 of the chamber 108. The sensor 148 thus converts the temperature of the inner shell 110 into a signal which is indicative of the sensed temperature and communicates this information to the ECU via known means.

FIG. 5 best illustrates the exhaust gas temperature sensor 146. The sensor 146 is removably attached to a mounting aperture formed in an upper section of the chamber 108. A transducer element 152 cantilevers from one side of the inner shell 110 to position its distal end to generally lie at the center line CL.

Figure 7:
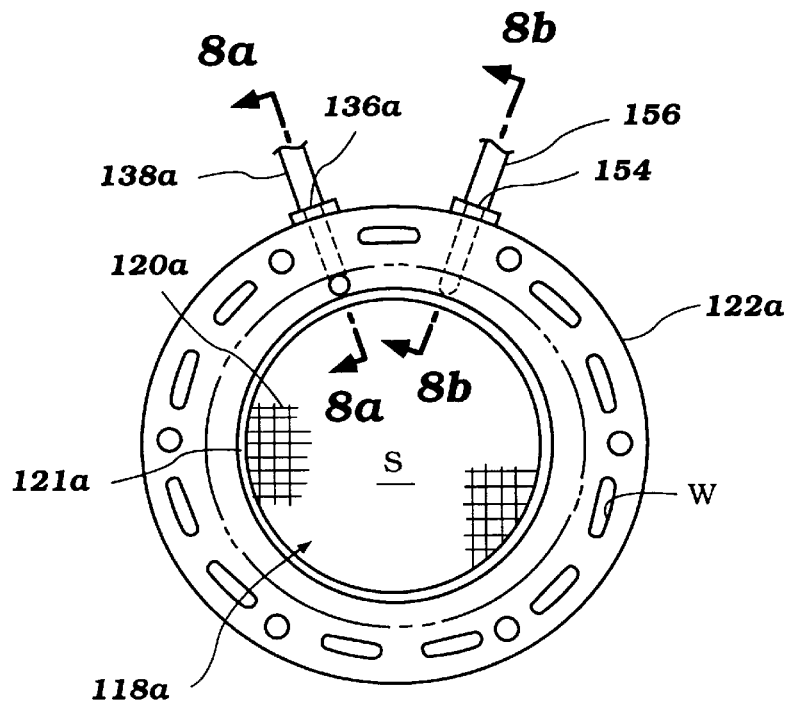
FIG. 7 is another embodiment of a catalyst device that includes an exhaust gas collection port.
Figures 8A, 8B:
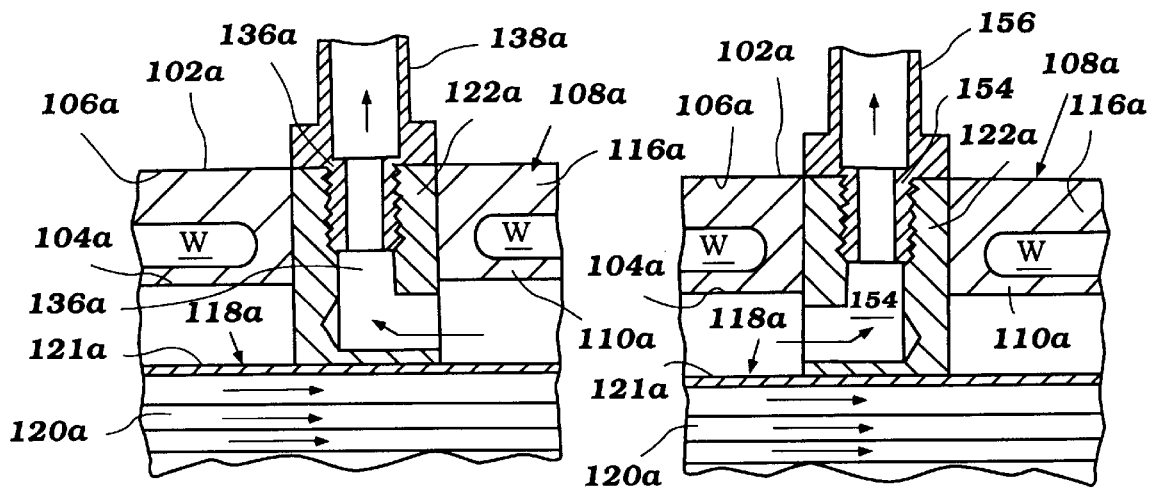
FIG. 8(a) is a partial cross-sectional view of the catalytic device of FIG. 7 taken along line 8a—8a and illustrates the catalytic device in an assembled position within the exhaust system.
FIG. 8(b) is a partial cross-sectional view of the catalytic device of FIG. 7 taken along line 8b—8b and similarly illustrates the catalytic device in an assembled position within the present exhaust system.

FIGS. 7 and 8 illustrate a catalytic device which is configured in accordance with another embodiment of the present invention and can be used with an exhaust system of the type described above. To ease the reader's understanding of the present embodiment, like reference numerals with an "a" suffix are used to indicate similar parts of the two embodiments.

In the embodiment illustrated in FIGS. 7 and 8, the catalytic device 118*a* includes a catalyst bed 120*a* supported by a flange 122*a* in the manner described above. In this embodiment, however, the gas collection port as well as the collection element are integrated into the support flange.

As seen in FIG. 8(*a*), the collection port 136*a* is formed within the flange 122*a*. The port 136*a* has an L shape and opens on the downstream side of the flange 122*a*. An outer end of the port 136*a* is tapped and receives a threaded end of the collection element 138*a* which communicates with an oxygen sensor or another gas analysis sensor.

The exhaust system 12*a* can also include another exhaust gas collection port 154. This second port 154 desirably has an L shape like the first port 136*a*, but opens on the upstream side of the flange 122*a* in order to sample exhaust gases before the gases pass through the catalytic device 118*a*. In the illustrated embodiment, an outer end of the port 154 is tapped and receives a threaded end of a collection element 156. The collection element can communicate with an oxygen sensor or another gas analysis sensor to monitor various aspect of the exhaust system. For instance, the exhaust collection ports 136*a*, 154 can be used to collect raw and treated exhaust gases in order to determine the efficacy or other performance characteristics of the catalytic device 118*a*. This of course can be done either for diagnostic purposes or for real time monitoring.

The catalytic device 118*a* with integral collection ports 136*a*, 154 thus can be used either alone or in combination with a separate, downstream collection port of the type described in connection with the embodiment illustrated in FIGS. 1–6. In addition, an integral upstream collection port 154 can be used with a collection port formed in the exhaust chamber 108 without the presence of an integral downstream collection port 136*a* for diagnostic purposes as well.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A watercraft comprising an internal combustion engine having at least one exhaust port and an output shaft, a propulsion device driven by the engine output shaft, an exhaust system including an exhaust passage that extends between the engine exhaust port and a discharge port, and a catalytic device to treat exhaust gases from the engine before discharge through the discharge port, a coolant inlet port opening into the exhaust passage downstream of the catalytic device, and a gas collection port opening into the exhaust passage at a point downstream of the catalyst device and upstream of the coolant inlet port.

2. A watercraft as in claim 1, wherein the coolant inlet port has a flow axis into the exhaust passage which extends away from the catalytic device.

3. A watercraft as in claim 1, wherein said exhaust system includes another gas collection port arranged within the exhaust system to collect exhaust gases before treatment by the catalytic device.

4. A watercraft as in claim 1, wherein the exhaust system includes a temperature sensor located between the gas collection port and the catalytic device.

5. A watercraft as in claim 1, wherein the exhaust system additionally includes a cooling jacket that extends along at least a portion of the exhaust passage about the gas collection port.

6. A watercraft as in claim 1, wherein the exhaust system includes a section which houses the catalytic device, the section having a central axis, and the exhaust gas collection port is located above the central axis.

7. A watercraft as in claim 1, wherein the catalytic device includes a flange which supports a catalyst bed within a portion of the exhaust passage, and the exhaust collection port extends through the flange and opens to the downstream side of the catalytic device.

8. A watercraft as in claim 7, wherein a second gas collection port extends through the flanges, and the gas collection ports are arranged to open on opposite sides of the flange.

9. A watercraft as in claim 8, wherein one of the gas collection ports is formed in an exhaust chamber of the exhaust system.

10. A watercraft comprising an internal combustion engine having at least one exhaust port and an output shaft, a propulsion device driven by the engine output shaft, an exhaust system including an exhaust passage that extends between the engine exhaust port and a discharge port, and a catalytic device to treat exhaust gases from the engine before discharge through the discharge port, a cooling jacket extending along a portion of the exhaust system in the vicinity of the catalytic device, said cooling jacket opening into the exhaust passage at a merger point downstream of the catalytic device, and a gas collection port opening into the exhaust passage at a point downstream of the catalyst device and upstream of the merger point.

11. A watercraft as in claim 10, wherein the gas collection port is formed in an exhaust chamber of the exhaust system.

12. A watercraft as in claim 11, wherein said exhaust system includes another gas collection port being arranged within the exhaust system to collect exhaust gases before treatment by the catalytic device.

13. A watercraft as in claim 10, wherein the catalytic device includes a flange which supports a catalyst bed within a portion of the exhaust passage, and the exhaust collection port extends through the flange and opens to the downstream side of the catalytic device.

14. A watercraft as in claim 13, wherein the exhaust system includes another exhaust collection port arranged within the exhaust system to collect exhaust gases before treatment by the catalytic device.

15. A watercraft as in claim 10 additionally comprising a temperature sensor located between the gas collection port and the catalytic device.

16. A watercraft as in claim 15, wherein the temperature sensor is located to generally coincide with a centerline of a portion of the exhaust passage through the exhaust system.

* * * * *